United States Patent Office 3,525,606
Patented Aug. 25, 1970

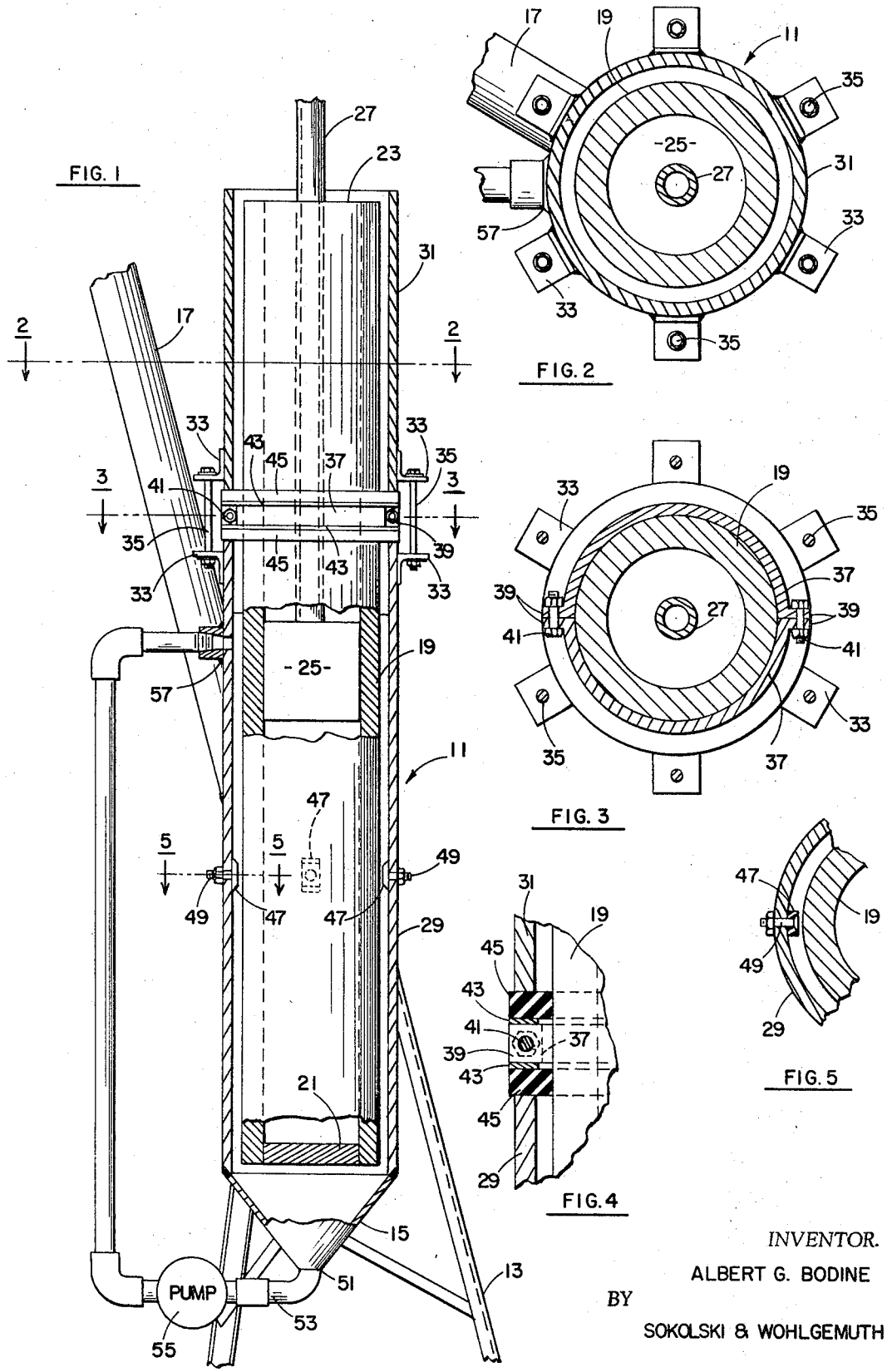

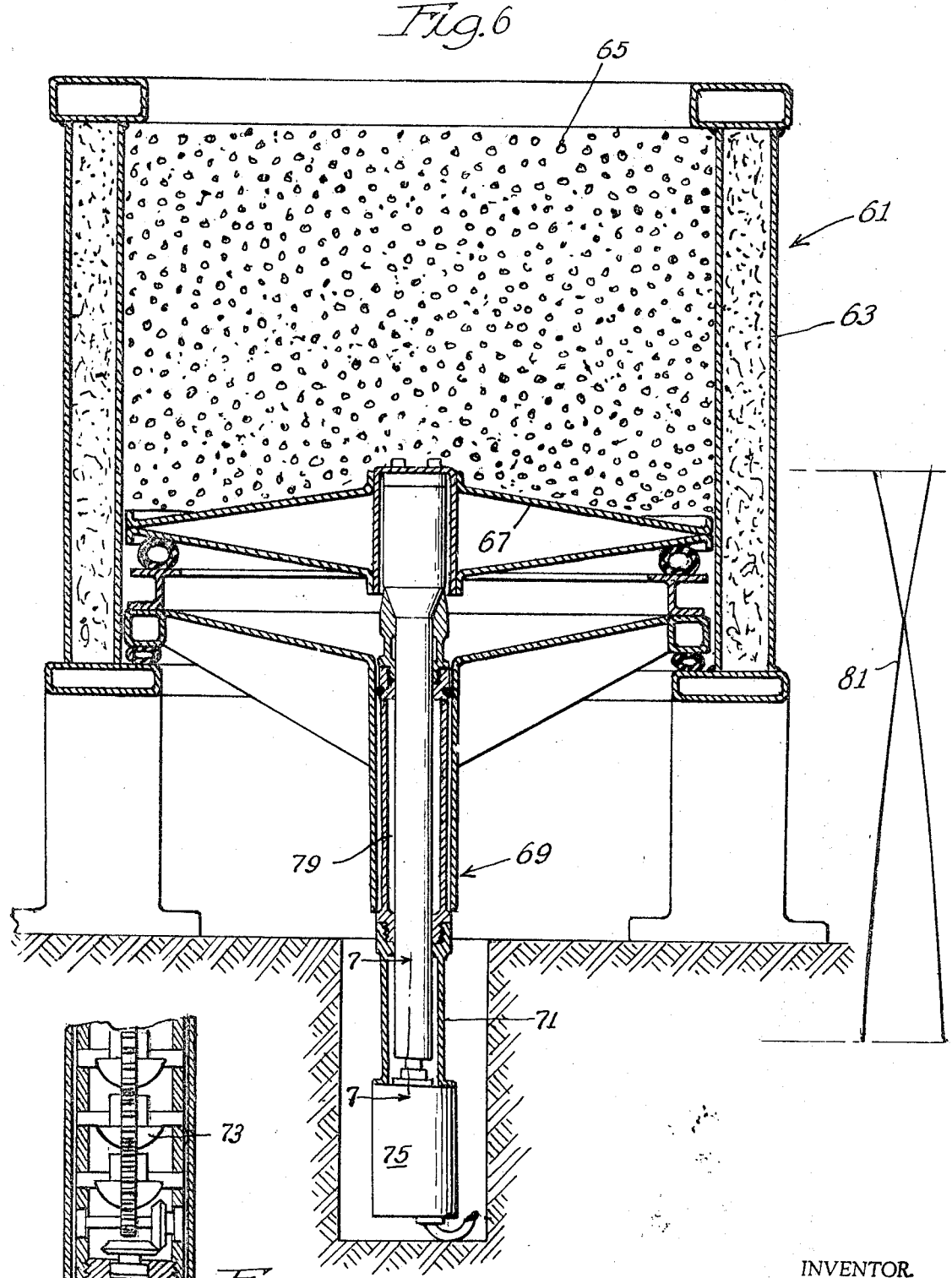

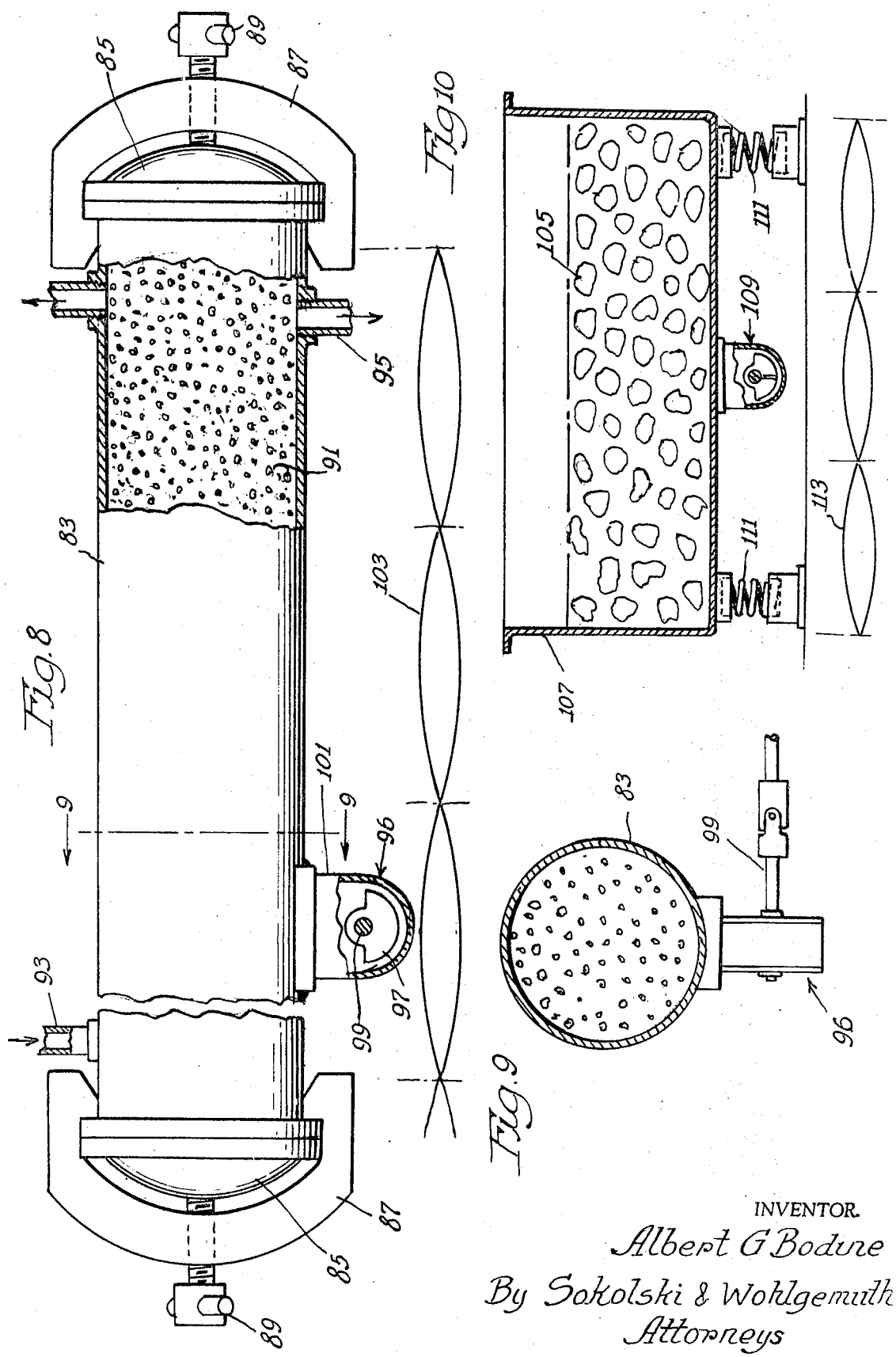

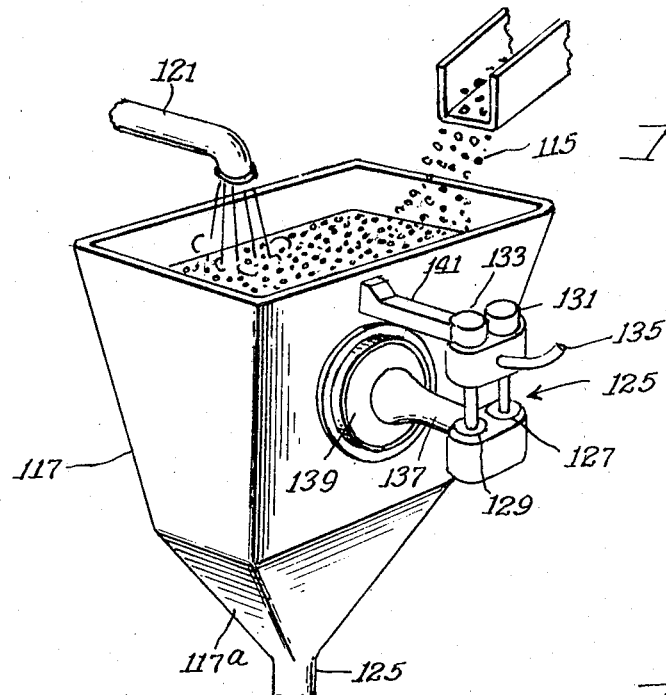
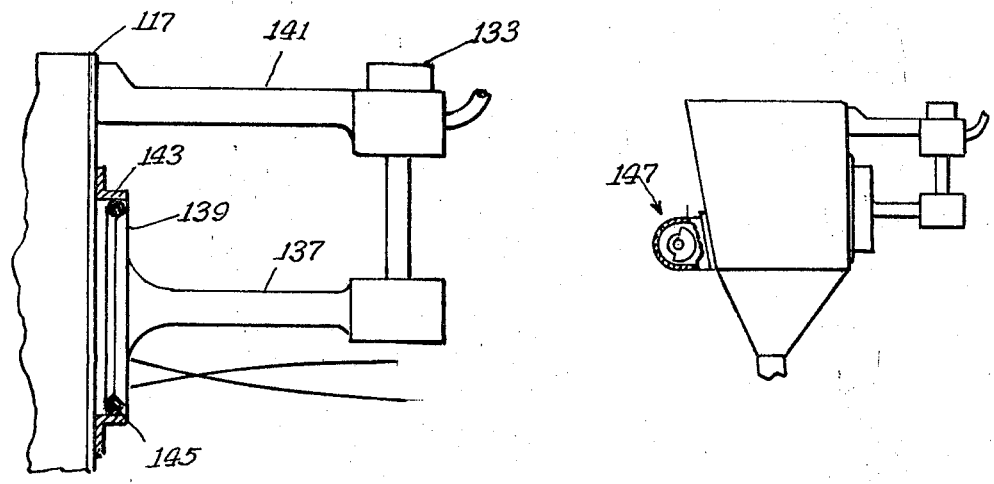

3,525,606
VIBRATIONAL METHOD FOR PENETRATING, LEACHING AND EXTRACTING MINERALS
Albert G. Bodine, 7877 Woodley Ave.,
Van Nuys, Calif. 91406
Filed Jan. 16, 1968, Ser. No. 698,166
Int. Cl. C22b 3/02
U.S. Cl. 75—101         3 Claims

ABSTRACT OF THE DISCLOSURE

A method and apparatus for leaching and extracting materials comprised of utilizing a tank to which is fed the composition to be leached and the leaching solution. Acoustically coupled to the tank is an orbiting-mass oscillator with a suitable resonator element so as to effect high resonant sonic energy within the tank, to the degree that cavitation of the liquid is obtained.

---

The leaching or extraction of metals from ore is an old art. As is well known, it involves the utilization of a solution in which the metal salt in the ore will dissolve. In other words, the solution serves as a solvent for the metal salt in the ore. Additionally, leaching involves, for example, separation of tannin from barks and mineral salts from roasted ores. The solution in the leaching process containing the soluble material therein is eventually separated so that the desired soluble component can be obtained. In prior art techniques, the leaching is done in large vats where the raw material is allowed to soak, usually for several days, in the leaching solution. Normally the ore is ground to a fairly fine degree prior to being placed in the leaching solution so that it can be penetrated by the bath chemicals. Even so, however, not all of the material is loosened from the parent earth material. This is particularly so in extremely fine particles of the mineral.

Thus it is an object of this invention to provide a method and apparatus for significantly reducing the residence time of an ore or other material to be leached in a leaching bath.

It is another object of this invention to provide a method and apparatus for improving the total recovery of mineral and the like from parent material in a leaching process.

The above and other objects of this invention are accomplished by the herein method and device which in one form utilizes a vertical elongated cylindrical tank to which is fed the ore and leaching solution. Disposed concentrically within the tank is a tubular resonator comprised of an elastic material which is not subject to attack by the leaching solution, such as stainless steel. Within the resonator tube is an orbiting-mass oscillator which effects a resonant vibration of the tube so as to achieve a standing wave pattern therein. The resonator tube may be supported from the wall of the tank at a nodal point so as to minimize transmission of sonic energy from the resonator to the tank itself. The leaching solution with the material to be separated therein circulates in the tank between the inner wall of the tank and the outer wall diameter of the resonator tube. Thus at the resonant condition utilizing high sonic energy, the particles of material in the solution are subjected to high forces due to the relative movement of the tube to the fixed walls of the tank. The best results of this invention are obtained when the energy level is such that cavitation is achieved in the tank. Utilizing this invention, effective leaching of ore can be achieved in a matter of minutes or hours, as compared to days in prior vat techniques. Not only is the time so significantly reduced, but additionally a much higher recovery of the soluble material is achieved.

In addition to the aforegoing embodiment, the method may be carried out in batch processes using various containers which are resonantly vibrated. Other continuous processing of the material to be leached involves processing through containers which have the walls thereof resonantly vibrated with no central vibrating element needed.

It is believed the invention will be better understood from the following detailed description and drawings in which:

FIG. 1 is a partially sectioned pictorial view of a first embodiment of apparatus utilized in the method of this invention;

FIG. 2 is a sectional view taken along lines 2—2 of FIG. 1;

FIG. 3 is a sectional view taken along lines 3—3 of FIG. 1;

FIG. 4 is an enlarged sectional detail view showing the means for mounting the resonator tube in the tank of the first embodiment;

FIG. 5 is a partial section view taken along lines 5—5 of FIG. 1;

FIG. 6 is a partially sectioned view of a second embodiment of apparatus which may be used for practicing the method of this invention;

FIG. 7 is a sectional view taken along line 7—7 of FIG. 6;

FIG. 8 is a partially sectioned view of a third embodiment of apparatus which may be used for practicing the method of this invention;

FIG. 9 is a sectional view taken along line 9—9 of FIG. 8;

FIG. 10 is a partially sectioned view of another embodiment of apparatus which may be used to practice the method of the invention;

FIG. 11 is a partially sectioned view of a final exemplary embodiment of apparatus which may be used for practicing the method of this invention;

FIG. 12 is an enlarged view of the oscillator and coupling used in the apparatus of FIG. 11; and FIG. 13 shows the device of FIG. 11 having an additional oscillator affixed thereto.

In order to facilitate the comprehension of the operation of the device of the invention, it is helpful to make an analogy between an electrical resonant circuit and a mechanical resonant circuit. This type of an analogy is well known to those skilled in the art, and is described, for example, in chapter 2 of "Sonics" by Hueter and Bolt, published in 1955 by John Wiley & Sons. In making such an analogy, force F is equated with electrical voltage E, velocity of vibration $u$ is equated with electrical current $i$, mechanical compliance $C_m$ is equated with electrical capacitance $C_e$, mass M is equated with electrical inductance L, mechanical resistance (such as friction) $R_m$ is equated with electrical resistance R. Mechanical impedance $Z_m$ is equated with electrical impedance $Z_e$. Thus, it can be shown that if a member is elastically vibrated by a sinusoidal force $F_0 \sin \omega t$, $\omega$ being equal to $2\pi$ times the frequency of vibration, $$Z_m = R_m + j\left(\omega M - \frac{1}{\omega C_m}\right) = \frac{F_0 \sin \omega t}{u} \quad (1)$$

Where $\omega M$ is equal to $$\frac{1}{\omega C_m}$$

a resonant condition exists, and the effective mechanical impedance $Z_m$ is equal to the mechanical resistance $R_m$, the reactive impedance components $\omega M$ and $$\frac{1}{\omega C_m}$$

cancelling each other out. Under such a resonant condition, velocity of vibration $u$ is at a maximum, effective power factor is unity, and energy is most efficiently delivered to the object being vibrated. It is such a high efficiency resonant condition in the elastic system being driven that is preferably utilized in the method and device of this invention to achieve the desired end results.

It is to be noted by reference to Equation 1 that velocity of vibration $u$ is highest where impedance $Z_m$ is lowest, and vice versa. Therefore, a high-impedance load will tend to vibrate at relatively low velocity, and vice versa. Thus, at an interface between high- and low-impedance elements, a high relative movement results by virtue of such impedance mismatch which, as in the equivalent electrical circuit, results in a high reflected wave. Such an impedance mismatch condition between a resonator tube, the wall of the tank and the material in the leaching solution can be utilized to free the soluble component from the basic raw material.

Just as the sharpness of resonance of an electrical circuit is defined as the "Q" thereof, and is indicative of the ratio of energy stored to the energy used in each cycle, so also the "Q" of the mechanical resonant circuit has the same significance and is equal to the ratio between $\omega M$ and $R_m$. Thus, high efficiency and considerable cyclic motion can be achieved by designing the mechanical resonant circuit for high "Q."

Of particular significance in the implementation of the method and device of this invention, is the high acceleration of the components of the elastic resonant system that can be achieved at sonic frequencies. The acceleration of a vibrating mass is a function of the square of the frequency of the drive signal times the amplitude of vibration. This can be shown as follows:

The instantaneous displacement $y$ of a sinusoidally vibrating mass can be represented by the following equation:

$$y = Y \cos \omega t \quad (2)$$

where $Y$ is the maximum displacement in the vibration cycle and $\omega$ is equal to $2\pi f$, $f$ being the frequency of vibration.

The acceleration $a$ of the mass can be obtained by differentiating Equation 2 twice, as follows:

$$a = \frac{d^2 y}{dt^2} = Y\omega^2 \cos(\omega t) \quad (3)$$

The acceleration $a$ thus is a function of $Y$ times $(2\pi f)^2$. At resonance, $Y$ is at a maximum and thus even at moderately high sonic frequencies, very high accelerations are achieved.

In considering Equation 1, several factors should be kept in mind. Firstly, this equation represents the total effective resistance, mass, and compliance in a mechanical circuit, and these parameters are generally distributed throughout the system rather than being lumped in any one component or portion thereof. Secondly, the vibrating system often includes not only the resonator but the leaching composition and material therein. Thirdly, an orbiting-mass oscillator is utilized with the device of the invention, that automatically adjusts its output frequency to maintain resonance with changes in the characteristics of the load. Thus, in situations where we are dealing with a fluid material which can contain varying amount of the solid raw material and thereby change its characteristics, the system automatically is maintained at optimum resonant operation by virtue of the "lock-in" characteristics of applicant's unique orbiting-mass oscillators. With these basic considerations in mind, let us now turn to the specific embodiments of the device of the invention.

Referring now to FIG. 1, there is seen a vertical elongated tank 11 supported at its bottom by support feet 13 so that it can be suitably affixed to the ground. Tank 11 is preferably provided with a funnel shaped bottom 15 which accumulates the material passing therethrough. Intersecting the tank 11 at approximately its midportion is an inlet line 17 through which is directed the incoming leaching solution and raw material. Disposed concentrically within the tank is resonator tube 19 which is comprised of an elastic material which is not subject to attack by the given leaching solution. Example of such material might be stainless steel. The resonator tube is closed at its bottom end 21 so as to prevent any of the material from seeping into it, while it is open at its top end 23.

Tightly fitted within the resonator tube 19 is an orbiting-mass oscillator 25. The orbiting-mass oscillator that is preferably used in this invention is shown and described with regard to FIG. 5 of U.S. Pat. No. 2,960,314 of Nov. 15, 1960 to the same inventor. As described in the patent, the orbiting-mass oscillator is driven by air pressure. Thus, as shown in FIG. 1, an inlet line 27 is directed through the top of the resonator tube to the orbiting-mass oscillator 25. The exhaust air alternately will exit through the top of the tube and out through the top of the tank.

The vertical tank 11 is actually comprised of two portions, a bottom portion 29 and a top portion 31. Each portion is provided with a plurality of matching flanges 33 extending radially outwardly about the periphery as seen in FIGS. 2 and 3 particularly. The flanges are joined together by long threaded bolts 35. As seen in FIG. 3 particularly, the resonator element 19 has two flexible metal bands 37 each surrounding one half of its outer circumference. The bands are joined together by extending flange portions 39 by bolts 41. Resting on either side of the flange are two steel discs or washers 43 as particularly seen in FIG. 4. Adjacent the washers are disposed circular neoprene pads 45 upon which rest the top and bottom portions of container 11. The bands 37 are affixed to the resonator tube at a nodal position where there is virtually no vibration. Thus it is desirable that the bands be adjustable as shown, so that they can be moved to this location. The flange portions 39 extending outwardly from the bands serve as the link to the outer container 11 and support the resonator within the container. In order to completely and effectively isolate the outer container sonically from the resonator tube, the rubber rings or mounts 45 are located between the flanges and the walls of the container. The tightening of the bolts 35 on the outer flanges 33 of the top and bottom portions of the container serves to maintain tight contact between the rubber pads 45 and the flange portions 39 of the bands surrounding the resonator tube. Discs 43 serve to prevent flange portions 39 from cutting into neoprene members 45. It should be apparent that what is disclosed is one particular arrangement. Any other configuration is suitable wherein the same purpose is achieved, namely to support the resonator tube at a point of minimum vibration and acoustically isolate the resonator tube from the outer container.

At the high vibrational energies required to achieve cavitation, there is the possibility that the resonator tube 19 could contact the walls of the container 11. This would obviously result in severe dissipation of the energy and affect the results of the invention. In order to prevent the transmission of the sonic energy to the walls of the container, a plurality of isolators are disposed on the inner walls of the bottom half 29 of the container 11, located toward the bottom of the resonator tube. These isolators are comprised of discs 47 of rubber or similar material secured by bolts 49 to the walls 29 of the container. Thus the contact of the resonator tube 19 with the neoprene discs 47 prevents any dissipation of sonic energy as well as inhibits the possibility of any portion of the tube from actually coming in contact with the walls of the container.

Connected to the bottom outlet 51 of the funnel portion 15 is a recirculation pipe 53 which has a conventional slurry pump 55 affixed thereto. The pump 55 which, of course, will be chosen to be chemically resistant to the leaching material, pumps the material in the tank from the outlet 51 back to an inlet 57 disposed near the top of the bottom portion 29 of the tank. As can be appreciated, the liquid level in the tank does not rise above the bottom portion 29 due to the sealing of the neoprene pads 45 which tightly engage the tube when bolts 35 are tightened, squeezing the pads inwardly toward the resonator. In any event, the solution fed to the tank initially is generally sufficient only to fill it to a point equivalent to the location adjacent the inlet line 57. Since in many leaching operations, such as leaching of ore, the particles tend to gravitate to the bottom of the tank, it is desirable in this embodiment to utilize the recirculation to continually assure the placement of particles between the walls of the resonator tube 19 and the tank 11 to achieve the desired effects.

In carrying out this invention it is found that when sonic energy is maintained at a high energy level, such as where cavitation occurs, the leaching liquid penetrates the particles of the raw material such as the mineral ore, with uniquely violent sonic action. This results in extremely fine, practically molecular size, mineral particles being released from strong mechanical bonding and coating by the parent earth material. In other words, the sonic energy serves as a penetrant into the parent earth material to cause a release and extraction of the mineral therein. Thus, in other words, the resonant sonic energy is sufficiently high to achieve a penetration of the liquid into the moderately finely ground ore particles, or applies the liquid against the surfaces of the ore particles at such a sonic level that the mineral is actually extracted from the particles. It is hypothesized that the apparent penetration of the liquid into the particles is due to some sort of release or neutralization of bonding forces so that the extraction can readily occur.

Turning now to FIG. 6, there is shown an embodiment of this invention utilizing a batch process. As shown therein, the device 61 comprises tank 63 filled with the particulate matter 65 in a leaching solution. A vibration radiator dome 67 is immersed in the material so as to impart vibrational energy thereto. The vibration generator 69 comprises an orbiting-mass oscillator 71 having eccentric rotors 73 which are shown particularly in the sectional view of FIG. 7. The eccentric rotors 73 are rotationally driven by motor 75 through drive shaft 77. The orbiting-mass oscillator generates mechanical vibrational energy in the sonic frequency range. This energy is transferred to the radiating dome 67 through casing member 79. The vibration generator 69 can be of the type described in my Pat. No. 3,033,158, filed May 8, 1962. The particulate material 65 in the leaching solution is first filled into the tank 63. The vibrational output of the vibration generator 69 is controlled so as to preferably attain a cavitation effect within the tank. This is continued until the material has been thoroughly leached. A typical standing wave pattern 81 is shown adjacent to the structure, indicating the form of wave generated by the vibration generator device 69.

FIGS. 8 and 9 disclose another typical device used for either a continuous processing or batch processing selectively to practice the method of this invention. As seen therein, a contained 83 of cylindrical shape has pressure end covers 85 which are held in place in fluid-tight relationship with the main body of the container by means of clamping members 87. Clamping members 87 are tightened in place by means of threaded handle members 89. Container 83 is filled with the leaching solution and solid particulate particles 91 to be leached. In a continuous process, the materials and solution can enter an inlet 93, exiting from outlets 95. Alternatively, the device can be utilized for a batch process by having valve means to close both the inlet and outlets after the tank has been filled.

Attached to the wall of container 83 is an orbiting-mass oscillator 96. Oscillator 96 moves a rotatably mounted eccentric rotor unit 97 which is rotatably driven on shaft 99 by means of a motor (not shown). With the rotation of rotor 97 vibrational energy is generated in oscillator housing 101, and this energy is transferred to the container 83. The rotation speed of rotor 97 is preferably adjusted so as to cause resonant vibration of the container 83 to achieve a cavitation of the material in the tank. A standing wave pattern can be set up within the tank in accord with the pattern 103 as shown.

Referring now to FIG. 10, the leaching of larger particulate particles 105 is shown within a large open vat 107 which is filled with the leaching fluid. Sonic energy is imparted to the vat 107 and thence to the material therein by means of orbiting-mass oscillator 109 which is similar to the orbiting-mass oscillator described in connection with FIGS. 8 and 9. Vat 107 is mounted on vibration isolators 111 to minimize the transfer of vibrational energy to surrounding members. A standing wave pattern in accord with the diagram 113 is thus generated within the vat.

Referring now to FIGS. 11–13, a further embodiment particularly useful for a continuous operation of the method of this invention is shown. The particulate matter 115 to be leached is directed to a hopper 117 by a suitable conveyor 119. Concurrently, the leaching solution is directed to the hopper through inlet pipe 121. The bottom end 117a of the hopper 117 is open and feeds into an outlet tube 123. Orbiting-mass oscillator unit 125 comprises a pair of eccentric rotors 127 and 129 which are driven in opposite directions by means of pneumatic motors 131 and 133, respectively. Pneumatic motors 131 and 133 utilize conventional turbine blades (not shown) which are driven by an air stream fed thereto through pneumatic line 135. Rotors 127 and 129 are phased with respect to each other so that vibrational components along the longitudinal axis of vibration arm 137 are additive and vibrational components transverse to this longitudinal axis effectively cancel each other out. The rotation frequency of rotors 127 and 129 is such as to set up standing wave resonant vibration on vibration arm 137 and its associated vibration disc 139, so as to preferably effect a cavitation within the hopper 117. The oscillator motor assembly is supported on the wall of the hopper 117 by means of support bracket 141.

Disc member 139 is abutted tightly against the surface of hopper 117 being resiliently held within ring member 143 by means of a rubber O-ring 145. Ring member 143 is fixedly attached to the wall of hopper 117 as for example by welding. Arm 137 thus in response to vibrational output of oscillators 125 longitudinally vibrates disc 139 against the wall of hopper 117, this vibrational energy being transferred to the wall of the hopper. If desired, the portion of the hopper wall opposite disc 139 can be cut out so as to permit the disc 139 to apply its resonant sonic energy directly to the contents of the hopper.

A second orbiting-mass oscillator unit 147 can be mounted on the opposite side of the hopper to provide a further vibrational force thereto, also aiding the flow of the material through the hopper. This is a single oscillator of eccentric orbiting mass and is similar to that shown in the embodiments of FIGS. 8 and 10.

While the method and apparatus of the invention have been described and illustrated in detail, it is to be clearly understood that this is intended by way of illustration and example only and is not to be taken by way of limitation the spirit and scope of this invention being limited only by the terms of the following claims.

I claim:
1. A method of leaching comprising:
    feeding material to be leached and leaching solution to a container,
    generating sonic energy with an orbiting mass oscillator, resonantly vibrating an elastic vibration system with said sonic energy so as to set up a sonic resonant vibration pattern therein, and acoustically coupling sonic energy from said resonant elastic vibration system to said material and said solution to cause said solution to penetrate said material and release fine particles therefrom.

2. The method of claim 1 comprising:

vibrating said resonant elastic vibration system at an energy level sufficient to achieve cavitation of the solution.

3. The method of claim 1 further comprising:

recirculating the material and solution from the bottom of said container to a point toward the top thereof.

References Cited

UNITED STATES PATENTS 2,717,768   9/1955   Carpenter.
2,830,904   4/1958   Arentoft et al.
2,907,455   10/1959  Sasaki.

L. DEWAYNE RUTLEDGE, Primary Examiner

E. L. WEISE, Assistant Examiner

U.S. Cl. X.R.

23—267